United States Patent [19]

Spanek

[11] Patent Number: 4,557,188
[45] Date of Patent: Dec. 10, 1985

[54] RACK FOR COOKING FOODS SUCH AS ARTICHOKES

[75] Inventor: Denis Spanek, San Mateo, Calif.

[73] Assignee: Chicago Wirecraft, Inc., Chicago, Ill.; a part interest

[21] Appl. No.: 590,158

[22] Filed: Mar. 16, 1984

[51] Int. Cl.⁴ .............................................. A47J 27/04
[52] U.S. Cl. ...................................... 99/415; 99/426; 99/440; D7/409; 211/181
[58] Field of Search ................. 99/410, 415, 418, 419, 99/426, 440; 211/181; 248/153, 175; D7/403, 409

[56] References Cited

U.S. PATENT DOCUMENTS

| | | | |
|---|---|---|---|
| D. 199,992 | 1/1965 | Sofio | 99/440 X |
| D. 274,880 | 7/1984 | Bentson | D7/409 |
| 1,699,935 | 1/1929 | Warnes | 99/440 |
| 3,143,059 | 8/1964 | Sofio | 99/440 |
| 3,986,445 | 10/1976 | Hooton | 99/426 |

FOREIGN PATENT DOCUMENTS 588588  5/1947  United Kingdom ................ 99/415

Primary Examiner—Billy J. Wilhite
Attorney, Agent, or Firm—Julian Caplan

[57] ABSTRACT

A wire rack has upward extending bent points and downward extending similar bent points. Preferably, the spacing between points at one end is greater than the spacing at the other end. The points at one end serve as prongs which may be forced between the leaves of an inverted artichoke. The bottom ends function as legs to support the rack upright on the bottom of a pan of water. Steam rising from the pan penetrates between the leaves, steaming, rather than boiling, the vegetable. Either end may be placed up, depending on size of the artichoke. Very small artichokes may be placed inside the upturned points. Eggs and other products may be supported by the rack for steaming. The rack is also usable when serving food since it may be placed on the diner's plate. Even uncooked products such as oranges may be "presented" in this way. In a preferred form, two identical lengths of wire are bent to provide two upward and two downward extending points. The two wires are nested to intersect at four locations and welded or otherwise secured together at the intersections.

2 Claims, 7 Drawing Figures

RACK FOR COOKING FOODS SUCH AS ARTICHOKES

This invention relates to a new and improved utensil for cooking and serving foods such as artichokes. More particularly, the present invention comprises a rack used primarily for cooking vegetables, especially artichokes, eggs and other foods which should be maintained separated form others in a cooking pan. Additionally, the rack may be used for serving cooked food stuffs, or even uncooked foods such as oranges, since the rack holds the item in a position so that it is conveniently accessible to the diner.

During cooking, the rack preferably rests on the bottom of a pan which is partially filled with water. The object being cooked is elevated above the water level. Steam rises from the bottom of the pan and penetrates the leaves of an item such as artichokes, steaming the same without boiling away flavor and food values.

The rack of the present invention is preferably made of one or two lengths of wire bent in a plurality of acute angles to form sets of top and sets of bottom points or prongs. One set of prongs serves to hold the object being cooked; the other set serves as legs. In a preferred embodiment, the spacing between one set of prongs is greater than the other. Thus, depending upon the size of the object being steamed, one set of prongs or the other may be upright to engage the item being cooked and the other set serves as legs.

When used to cook artichokes, a feature of the invention is the fact that the artichoke is supported with the stem up and the leaves down. Thus, steam rising from the bottom of the pan circulates inside the leaves, cooking the leaves to their very roots. The uppermost set of prongs fits inside the leaves, securing the artichoke to the rack during cooking and also during serving.

Small artichokes and other food items such as eggs may be nested within the upper set of prongs rather than forcing the prongs inside the leaves.

A feature of the preferred embodiment of the invention is that there is different spacing between the top set of prongs and the bottom set of prongs. Thus, if the larger spaced prongs are uppermost, they will fit inside the leaves of a large artichoke. On the other hand, if the smaller spaced prongs are uppermost, they will fit inside the leaves of a medium-sized artichoke.

A feature and advantage of the present invention is that it is easy to use. The uppermost prongs slide securely into the artichoke. The legs are then placed on the bottom of the pan so that the stem of the artichoke is uppermost. The bottommost part of the artichoke is elevated approximately ½ inch above the water line in the pot.

Another feature of the invention is that cooking is faster when racks of the present invention are used. The steam flows upward, penetrating the inner leaves and heart. Cooking time is reduced 35 to 55 percent over conventional artichoke cooking methods. The fact that the artichoke is inverted allows the chef to test for accurate cooking time, since a preferred method of testing whether an artichoke is fully cook is to prick the end of the stem with a fork or the like.

Still another feature of the invention is that, because the rack permits steaming, herbs and spices may be added to the cooking water and the flavoring of these herbs and spices rises with the steam and penetrates the leaves. Steaming improves the flavor of the artichoke and also insures that natural vitamins are retained.

Still another feature of use of the present invention is that the racks may be nested or stacked in a pot, thoroughly utilizing the space.

A still further advantage of the invention is that the rack may be removed from the pot and placed directly on the plate, or a platter. The rack prevents the artichokes from falling over or moving awkwardly on the plate. Since the stem is uppermost, access to the leaves is facilitated. Thus, the artichoke, egg, or other item may be held by the rack when being eaten as well as when being cooked.

Other objects of the present invention will become apparent upon reading the following specification and referring to the accompanying drawings in which similar characters of reference represent corresponding parts in each of the several views.

Figure 1:
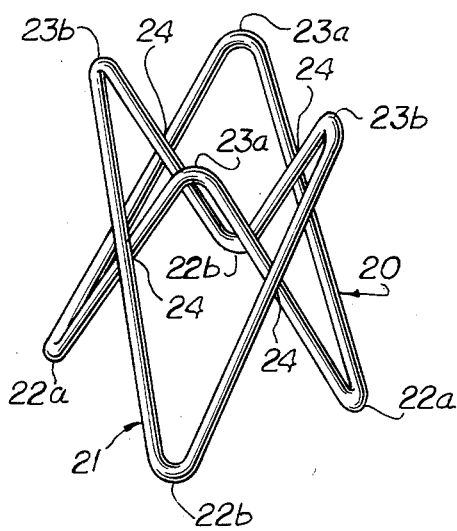
FIG. 1 is a perspective view of one embodiment of the rack with the large end down.

The rack of FIGS. 1-7 is made of two pieces of wire 20, 21, each formed with four acute angle bends. An opposed set of bends 22a of the wire 20 are at a wider angle than the other set of bends 23a. Similarly, the set of bends 22b of the wire 21 are at a wider angle than the bends 23b at the opposite end. The shapes of the wire sections 20 and 21 are preferably substantially identical. The two bent wires 20, 21 are nested as shown in FIG. 1 so that they intersect. At the intersections 24, the wires are welded, soldered, brazed or otherwise connected together. Preferably the wires are chromium plated so that they do not rust and do not affect the taste of the objects being cooked.

Directing attention to FIG. 1, it will be seen that the bends which may be termed prongs or legs 22a, 22b are spaced farther apart than the prongs or legs 23a or 23b at the other end. Either end of the rack may be placed uppermost.

Figure 3:
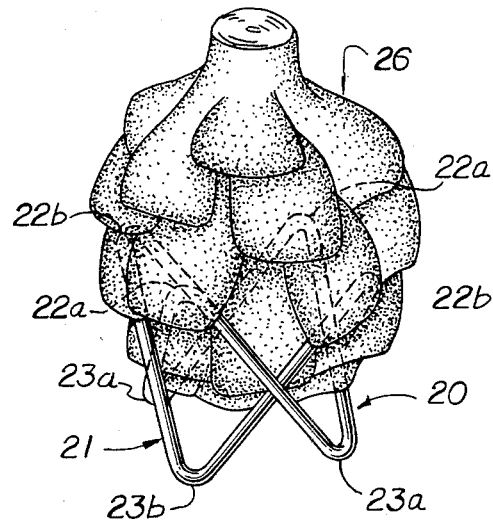
FIG. 3 is a perspective view of the rack with the large end up supporting a large artichoke.
Figure 2:
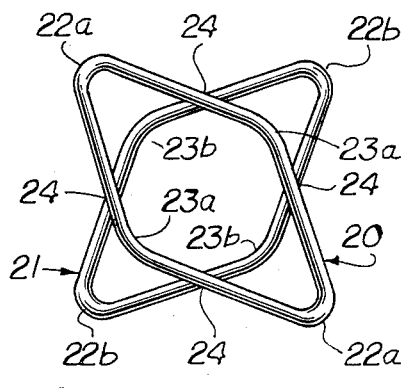
FIG. 2 is a top plan view thereof.
Figure 4:
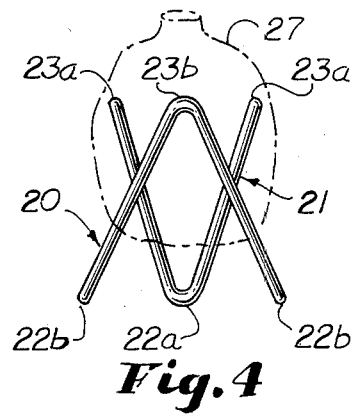
FIG. 4 is a side elevational view showing the small end up supporting a medium-sized artichoke.
Figure 5:
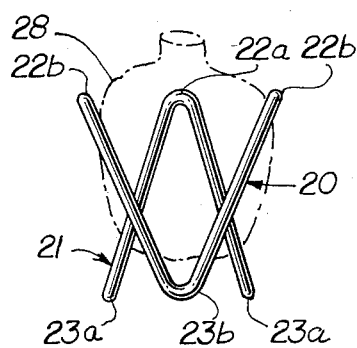
FIG. 5 is a side elevational view with the larger end uppermost supporting a small artichoke.

A preferred use for the rack of the present invention is for steaming artichokes. Artichokes are sold in various sizes, such as the large, or jumbo size 26, the medium size 27 and the small size 28. In cooking a jumbo-size artichoke 26, the prongs 23a, 23b are uppermost. These prongs are forced in between the leaves of the artichoke causing the rack to adhere thereto. The stem is uppermost and the leaves are down permitting steam rising from the bottom of the pan (not shown) on which the legs 22a, 22b rest to rise and circulate in between the leaves, facilitating cooking. Since the stem is uppermost, it is accessible for testing whether the item is thoroughly cooked. After the artichoke has been cooked it may be placed on a platter or plate exactly in the position shown in FIG. 3. The diner may conveniently remove the leaves one by one when eating the artichoke. Also the frond is easily accessible.

Where a medium-sized artichoke 27 is used, as in FIG. 4, the rack is inverted from the position of FIG. 3 so that the prongs 22a, 22b are uppermost. Hence, the prongs fit within the outer leaves of the artichoke 27.

When very small artichokes 28 are to be cooked, the prongs need not be forced between the leaves. The artichoke 28 seats between prongs 23a, 23b (or, if desired, between the prongs 22a, 22b).

Figure 6:
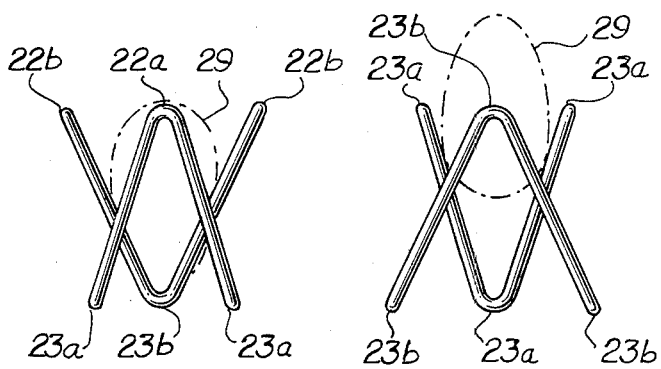
FIG. 6 is a view similar to FIG. 5 showing the rack supporting an egg.
Figure 7:
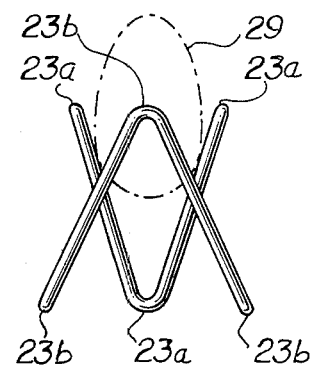
FIG. 7 is a view similar to FIG. 4 showing the rack supporting an egg.

FIG. 6 shows how the rack may be used to cook an egg. In FIG. 6, the egg is positioned with the smaller end down and the more widely spaced prongs 23a, 23b uppermost.

After cooking, the rack may be inverted and the egg 29 positioned therein for convenient dining.

Thus, the present invention provides means for both cooking and serving food items. The items being cooked are held in position on the rack and do not crowd against each other during cooking. Further, they are elevated above the bottom of the pan so that cooking is performed primarily by steaming. Holding the items being cooked in place is particularly advantageous when eggs 29 are being steamed.

Even uncooked items such as a half orange may be "presented" on the rack to facilitate eating with a spoon.

Although use of the rack with several different foods items has been illustrated and described, it will be understood that a variety of food items may be supported and even items other than foods may be held in the rack.

What is claimed is:

1. A rack for steaming and cooking artichokes and other items formed of two separate lengths of rigid wire each of said lengths being substantially identical and bent at at least four acute angle prongs, said rack having a first end and a second end, there being at least two prongs at the first end and at least two prongs at the second end, the wires between the prongs being substantially straight and of equal length, whereby either end may rest on the bottom of a pan or on a dish to support the rack upright with the opposite end up to support the food item, said separate lengths of wire crossing and being in close proximity at a plurality of intersections, said wire lengths being secured together at at least some of said intersections, whereby the artichoke is elevated above the surface on which said rack rests with the stem up and leaves pointing down so that steam may rise up between the leaves, the prongs of the uppermost end penetrating under the leaves of the artichoke.

2. A rack according to claim 1 in which the angles at the first end are greater than at the second end, whereby the distances between prongs at the second end are greater than the distances between prongs at the first end.

* * * * *